Aug. 31, 1937.   D. R. PATTISON   2,091,521
INSULATOR TESTING DEVICE
Filed July 26, 1933   2 Sheets-Sheet 1

INVENTOR
Donald R. Pattison,
BY Stone, Boyden & Mack,   ATTORNEYS

Aug. 31, 1937.  D. R. PATTISON  2,091,521
INSULATOR TESTING DEVICE
Filed July 26, 1933  2 Sheets—Sheet 2
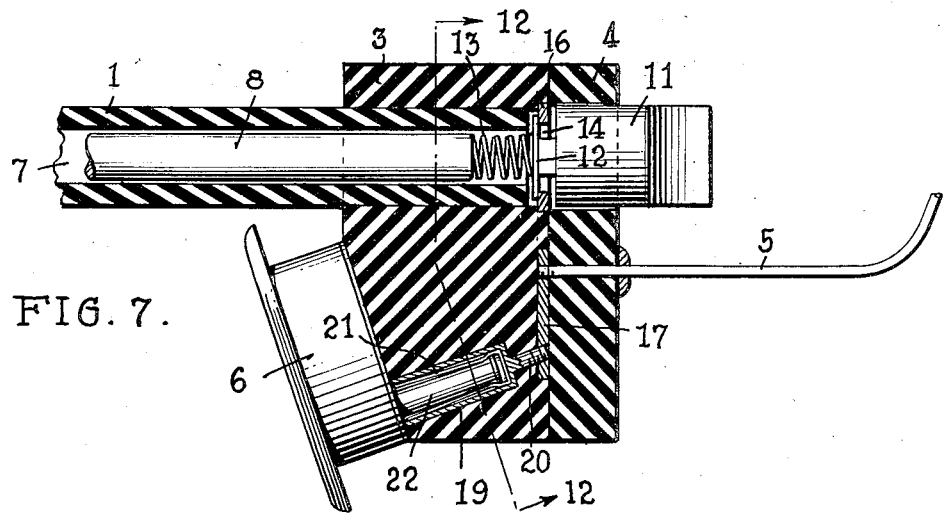
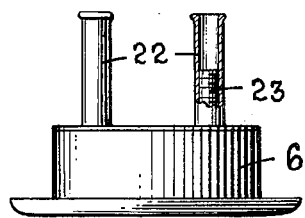
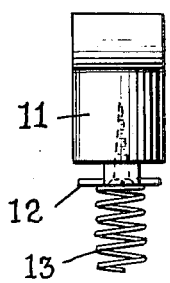
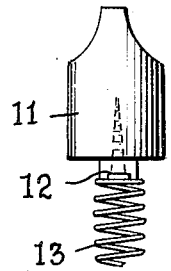
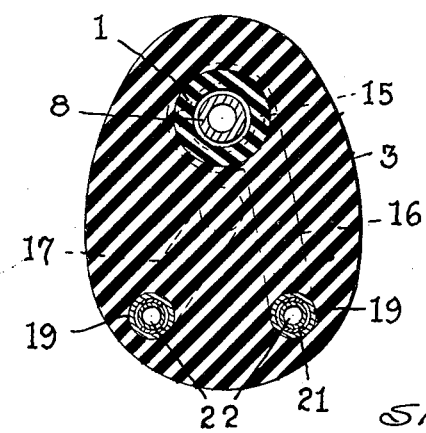
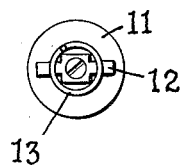
INVENTOR
Donald R. Pattison,
BY
Stone, Boyden & Mack, ATTORNEYS.

Patented Aug. 31, 1937

2,091,521

UNITED STATES PATENT OFFICE 2,091,521

INSULATOR TESTING DEVICE

Donald R. Pattison, Johnstown, Pa., assignor to Railway & Industrial Engineering Co., Greensburg, Pa., a corporation of Pennsylvania Application July 26, 1933, Serial No. 682,345

6 Claims. (Cl. 175—183)

This invention relates to electrical testing or voltage indicating apparatus, and more particularly to a device for testing electrical insulators while they are in actual use and subject to high voltage.

Attempts have heretofore been made to provide apparatus of this general character, but such prior devices have either depended upon more or less uncertain audible or luminous signals for their operation, or else have embodied extremely delicate parts such as radio tubes.

The primary object of the present invention, therefore, is to provide a portable, high voltage or insulator testing device which shall be simple in construction, free from delicate parts, and which shall be direct reading and at the same time capable of giving indications which are sufficiently accurate for all practical purposes.

With the above principal object in view, and to improve generally upon the details of such apparatus, the invention consists in the construction and arrangement of parts hereinafter described and claimed, and illustrated in the accompanying drawings, in which:

Figure 1:
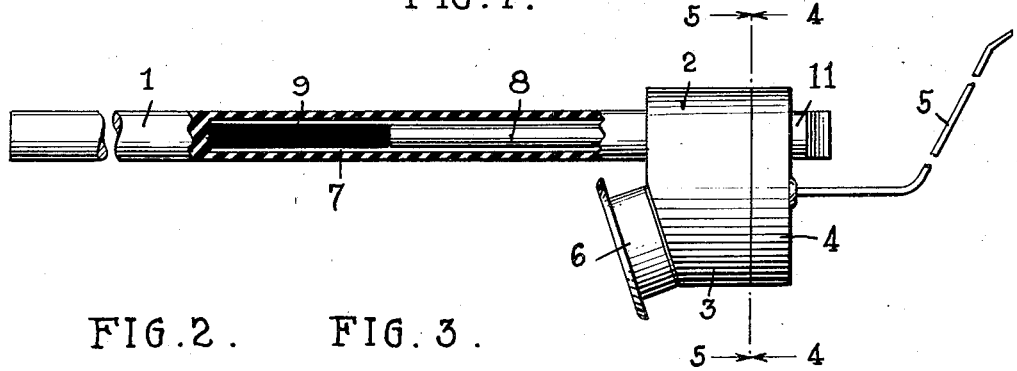
Fig. 1 is a side elevation of my complete improved testing device, parts being broken away and parts shown in section.
Figures 2, 3, 4, 5:
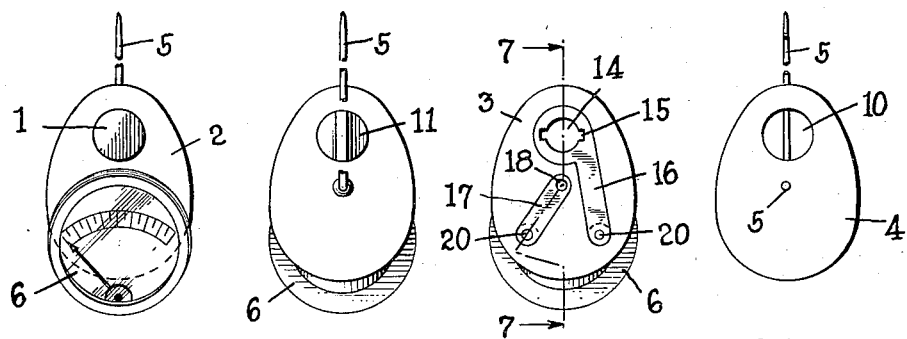
Fig. 2 is an end elevation as viewed from the left of Fig. 1.
Fig. 3 is an end elevation as viewed from the right of Fig. 1, parts being broken away.

Figs. 4 and 5 are views of the opposed faces of the two sections of the head of my improved device, looking respectively in the directions of the arrows 4—4 and 5—5 shown in Fig. 1.

Figure 6:
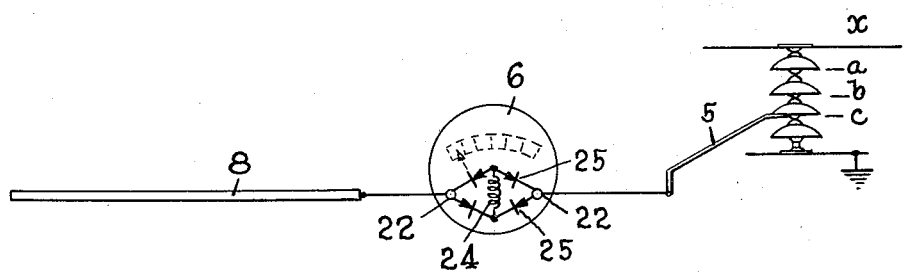

Fig. 6 is a diagrammatic view showing the electrical connections involved in the apparatus;

Fig. 7 is an enlarged longitudinal section on the line 7—7 of Fig. 4;

Fig. 8 is an edge view of the ammeter which I employ, parts being shown in section;

Figs. 9, 10, and 11 are side and end views of a removable plug forming part of the apparatus, and hereinafter more particularly described; and Fig. 12 is a transverse section substantially on the line 12—12 of Fig. 7, looking in the direction of the arrows.

Referring to the drawings in detail, my improved testing device comprises a handle 1 in the form of a long pole of insulating material, to the end of which is secured a block or head 2, also of insulating material, and formed in two matched sections 3 and 4, preferably cemented together. Projecting forwardly from the block or head 2 is a feeler rod or contact element 5, and mounted on the opposite side of the block adjacent the pole or handle is an indicating instrument or meter 6, hereinafter described more in detail.

The end of the pole or handle 1 adjacent the head 2 is provided with a longitudinal bore 7, and within this bore fits loosely an elongated conducting body 8, preferably consisting of a section of aluminum or other metallic tubing. The length of this section will vary in accordance with different conditions and in order that the shorter sections may be held firmly within the bore, I first place within the bore a rod or dummy 9 of insulating material, against which the inner end of the conductor section 8 abuts.

The section 3 of the head has a socket to receive the end of the pole or handle, as clearly shown in Fig. 7, and the section 4 is provided, opposite this socket, with a hole 10 into which a plug 11 of insulating material is adapted to fit. This plug 11 is shown in Figs. 9, 10, and 11, and comprises a cylinder of insulating material carrying at one end a cross bar or cleat 12, spaced therefrom as shown, and to this cleat 12 is secured a helical spring 13.

This cleat or bar 12 is adapted to pass through a pair of notches 15 formed in diametrically opposite sides of a circular opening 14 in a metallic strip 16, set in a recess in the outer face of the section 3 of the head, the opening 14 and notches 15 being disposed in alignment with the opening 10 and bore 7 above described. From the foregoing, it will be understood that the conductor section 8 is inserted into the bore 7 through the opening 14 and hole 10 and that after it has been so inserted, the plug 11 is placed in position, as shown in Fig. 7, with the end of the spring 13 bearing upon the conductor section 8 so as to hold it in place, and also so as to establish an electrical connection between said conductor section and the strip 16. It will be understood also that in assembling the parts, the plug 11 is inserted in such a position that the bar or cleat 12 is in alignment with and can pass through the notches 15, and after the plug is inserted, it is slightly rotated so that the ends of the bar 12 engage behind the edges of the opening 14 in the strip 16 and thus lock the parts in position, the spring 13 being slightly compressed.

Also embedded in a recess in the outer face of section 3 of the head is a conducting strip 17, as clearly shown in Figs. 4 and 12. The inner end of the strip 17 is provided with a screw threaded socket 18, adapted to receive the end of the feeler rod 5, which is inserted through the section 4 of the head and screwed into said socket.

The corner of the head 2 adjacent the handle 1 and against which the meter 6 is seated is preferably somewhat bevelled off, as shown in Figs. 1 and 7, so that the meter is disposed at a slight angle. Extending inwardly from this bevelled off face of the block or head are a pair of holes in which are mounted metallic socket members 19, each provided with a screw threaded shank 20. These threaded shanks respectively enter threaded openings in the lower ends of the conducting strips 16 and 17, as shown in Fig. 4.

The meter 6, as illustrated in Fig. 8, is preferably provided with copper or other conducting sleeves 22 fitted over the usual screw threaded terminals 23, and these metal sleeves are adapted to be inserted in the socket members 19 carried by the head section 3. In order to resiliently hold these terminal sleeves in position, the sockets preferably have housed in them suitable spring clips 21, which frictionally grip the sleeves 22. By this means, the meter is detachably but firmly mounted on the head or block 2, and its terminals are electrically connected respectively with the conductor strips 16 and 17. We have already seen that the strip 16 is in electrical connection with the conductor section 8 and that the strip 17 is connected with the feeler rod 5. Thus, a circuit may be traced from the feeler rod through the meter to the conductor section 8. This circuit connection is clearly shown in Fig. 7, in which 22 designates the terminals of the meter 6.

Theoretically, the meter 6 may be of any suitable type capable of measuring or indicating the flow of current. Practically, however, I find that a meter of the D'Arsonval type is the most sensitive and hence the most desirable. Since my improved testing device is intended to be used in connection with alternating currents only, and since meters of the D'Arsonval type respond only to direct current, it is necessary, where a meter of this type is employed, to use some kind of rectifying apparatus. A well known type of ammeter for measuring very small currents is provided with built-in rectifying apparatus connected in bridge form, so as to rectify both halves of the current wave. I preferably employ and have illustrated in Fig. 6 this type of ammeter. In this figure, 24 designates the meter coil, while copper oxide or other suitable rectifiers of the asymmetric cell type are indicated at 25. It will be seen that alternating current flowing back and forth through the circuit connections from the feeler rod 5 to the conductor section 8 will be rectified and the succeeding wave impulses will always pass through the coil 24 in the same direction.

It will of course be understood that while I have illustrated a direct current ammeter having a rectifier, and while I find that this type of ammeter is preferable in practice, my invention is by no means limited to this specific form of meter, since any type of instrument which is sufficiently sensitive and which is capable of responding to current flow may be employed.

Although my improved device may be used for measuring line voltage and for testing various forms of insulators and other electrical apparatus, I have illustrated in Fig. 6 how it is employed for testing the several units of a string of line insulators. Here $x$ indicates a high voltage line carrying alternating current and $a$, $b$, $c$, etc. the insulator units. As is well understood, the voltage of successive units further and further from the line should be less and less. Thus, if the voltage at a point between units $a$ and $b$ should be found to be substantially the same as that at a point between units $b$ and $c$, this would indicate that the unit $b$ is seriously defective and not performing its function. In testing insulators of this type, the feeler rod 5 is brought into contact with the metal connections or cement joints between the insulator units, and the meter reading observed for each joint.

It is obvious that what the meter actually measures is the difference of potential between the point to which the feeler rod is applied and the conductor section 8. This conductor section, held within the insulating pole, apparently forms a condenser with the earth and perhaps other conductors, and, therefore, has a certain electrical capacity, and when the feeler rod engages a source of high potential alternating current, as illustrated in Fig. 6, there is a surge of current back and forth through the meter, this being known as the "capacity current" or sometimes, but less accurately, as the "charging current". It is well understood that the value of this capacity current is directly proportional to the voltage of the point to which the feeler rod 5 is applied. Thus, the voltage existing at any part of an insulator or other electrical apparatus can be determined by observing the reading of the ammeter 6 which of course is actuated by the capacity current.

In order to adapt my improved device for measuring or testing voltages of widely varying character, I contemplate providing an interchangeable set of conductor sections 8 of different lengths. Other things being equal, the charging or capacity current varies of course as the length of the conductor section 8. Hence where relatively small voltages are being tested, I employ a relatively long conductor section, so as to produce a capacity current of a magnitude sufficient to move the pointer suitable distances over the scale. On the other hand, where the voltages being tested are very high, I employ a relatively short conductor section, so that the capacity current will be reduced to such an extent that the pointer will not be thrown off of the scale. My improved construction, including the removable plug 11, permits of the conductor sections being readily and conveniently changed as conditions may require, and the meter may be provided with several scales corresponding to the several lengths of conductor sections, the instrument being so calibrated that the voltages may be read directly from the respective scales.

What I claim is:

1. An insulator testing device comprising a pole of insulating material having a longitudinal bore, a head of insulating material secured to the end of said pole, and having an opening therethrough registering with the bore in said pole, an elongated conductor insertable into said bore through said hole, means for securing said conductor within said bore and for establishing electrical connections therewith, a feeler rod carried by said head, a current indicating instrument also mounted on said head, one terminal of said instrument engaging the connections extending to said elongated conductor and the other terminal being connected to said feeler rod.

2. An insulator testing device comprising a pole of insulating material having a longitudinal bore therein, a feeler rod carried at the end of said pole, an elongated conductor section housed within said bore, a current indicating instrument also carried by said pole and connected with said feeler rod and elongated conductor section, and means whereby said conductor section is removably held within said bore, whereby conductor sections of different lengths may be used interchangeably in accordance with different conditions.

3. An insulator testing device comprising a pole of insulating material having a longitudinal bore, a head of insulating material secured to the end of said pole, an elongated conductor enclosed within said bore, a feeler rod carried by said head, a current indicating instrument also mounted on said head, and means enclosed within said head electrically connecting said instrument with said elongated conductor and said feeler rod.

4. In an insulator testing device, a pole of insulating material having an upper hollow end, a head carried by said pole, a feeler rod and another conductor forming parts of a testing circuit, said conductor being positioned within the hollow end of said pole and said rod being carried by said head and having a terminal mounted upon the same, a terminal on said head electrically connected to said conductor, and a measuring instrument having terminals adapted to connect detachably with said terminals on said head to support said instrument on said head and to connect the same in series between said feeler rod and said other conductor.

5. An insulator tester of the type including an insulated pole carrying a testing circuit in which a feeler rod and a conductor are serially connected through an indicating device, the conductor constituting a condenser adapted to be charged when said feeler rod is contacted with a point of alternating current potential, characterized by the fact that a head is mounted on said pole, and said head and conductor have cooperating parts for detachably securing said conductor to said head, whereby conductors of different size may be readily substituted on said head in accordance with the magnitude of the voltage under investigation.

6. An insulator tester as claimed in claim 5, wherein said indicating device is a measuring instrument detachably mounted on said head, said instrument and head having cooperating sets of terminals constituting a mechanical support for said instrument upon the engagement of said sets of terminals to connect said instrument into the said testing circuit.

DONALD R. PATTISON.